United States Patent
Shahidi et al.

(10) Patent No.: US 6,931,257 B2
(45) Date of Patent: Aug. 16, 2005

(54) FAST FORWARD POWER CONTROL DURING SOFT HANDOFF

(75) Inventors: Reza Shahidi, San Diego, CA (US); Nirmal Velayudhan, Vista, CA (US)

(73) Assignee: Telefonaktiebolaget LM Ericsson (publ) (SE)

( * ) Notice: Subject to any disclaimer, the term of this patent is extended or adjusted under 35 U.S.C. 154(b) by 296 days.

(21) Appl. No.: 10/087,368

(22) Filed: Mar. 1, 2002

(65) Prior Publication Data

US 2002/0173309 A1 Nov. 21, 2002

Related U.S. Application Data

(60) Provisional application No. 60/272,999, filed on Mar. 2, 2001.

(51) Int. Cl.[7] .................................................. H04Q 7/20
(52) U.S. Cl. .......................... 455/522; 455/442; 455/69
(58) Field of Search ................................ 455/442, 522, 455/13.4, 68, 69, 134, 135, 136; 370/317, 318, 320, 331, 332, 333

(56) References Cited

U.S. PATENT DOCUMENTS

| | | | | |
|---|---|---|---|---|
| 5,884,187 A | * | 3/1999 | Ziv et al. | 455/522 |
| 5,893,035 A | * | 4/1999 | Chen | 455/522 |
| 5,982,760 A | * | 11/1999 | Chen | 370/335 |
| 6,298,241 B1 | | 10/2001 | Hong | |
| 6,351,651 B1 | * | 2/2002 | Hamabe et al. | 455/522 |
| 6,430,398 B1 | | 8/2002 | Blanc | |
| 6,587,442 B1 | * | 7/2003 | Tripathi | 370/311 |
| 6,675,184 B1 | | 1/2004 | Matsui | |

FOREIGN PATENT DOCUMENTS

| | | | |
|---|---|---|---|
| EP | 1069702 | 1/2001 | |
| WO | WO 9952310 | 10/1999 | |
| WO | WO 99/52310 | * 10/1999 | H04Q/7/30 |

OTHER PUBLICATIONS

Pub. No. US 2002/0002058 A1; Jan. 3, 2002; Hamabe.
"Adjustment Loop Transmit Power Control during Soft Handover in CDMA Cellular Systems" by Kojiro Hamabe; Development Laboratories, NEC Networks; 2000 IEEE.

* cited by examiner

Primary Examiner—Nay Maung
Assistant Examiner—Philip J. Sobutka
(74) Attorney, Agent, or Firm—Coats & Bennett, P.L.L.C.

(57) ABSTRACT

A wireless communication network includes base stations that operate with variable transmit power adjustments during soft handoff of a mobile station. Base stations adjust current transmit powers up or down using variable step sizes responsive to power control commands from the mobile station. Step size depends on the difference between current transmit power and a common reference power. Generally, power control commands that move transmit power away from the common reference power are attenuated by decreasing the step size, and those that move the transmit power toward the reference power are amplified by increasing step size. A base station controller adjusts the common reference power during soft handoff to reduce differences between it and the current transmit powers. Thus, step size may be large at the outset of soft handoff to quickly reduce transmit power imbalance between base stations, but tends to decrease with subsequent adjustments of the common reference power.

45 Claims, 5 Drawing Sheets

FAST FORWARD POWER CONTROL DURING SOFT HANDOFF

RELATED APPLICATIONS

This application claims priority from U.S. Provisional Application No. 60/272,999 filed Mar. 2, 2001 entitled "Power Offset Reduction Algorithm During Soft Handoff For Fast Forward Power Control."

BACKGROUND OF THE INVENTION

The present invention relates generally to methods of power control for wireless communication systems and, more particularly, to methods of forward link power control during soft handoff.

Numerous access schemes exist to allow multiple users to share a communication medium. One such access scheme is known as Code Division Multiple Access (CDMA). In CDMA systems, multiple users share the same carrier frequency and may transmit simultaneously. Each user has its own pseudo-noise (PN) sequence, which is approximately orthogonal to the PN sequences of other users. Transmissions to or from individual users are imprinted with that user's PN sequence. The receiver selects the desired signal, which combines with unwanted signal during transmission, by correlating the received signal with the PN sequence of the desired signal. All other undesired signals are spread by the PN sequence and appear as noise to the receiver.

Two standards for CDMA systems currently used in the United States are the IS-95 standard and the cdma2000 standard, which are described in specifications published by the Telecommunications Industry Association and Electronics Industry Association (TIA/EIA). The IS-95 standard was developed primarily for voice services and low rate data services. cdma2000 is a spread-spectrum radio interface that uses CDMA technology to satisfy the needs of third generation wireless communication systems. A significant benefit of cdma2000 is the ability to provide high-rate data services, in addition to voice services, for web browsing and other high data rate applications. In web browsing, the amount of traffic on the forward link is typically much larger than amount of traffic on the reverse link. Therefore, it is particularly important to increase spectrum efficiency, particularly on the forward link.

CDMA systems are inherently interference-limited systems. Since all mobile stations operate at the same frequency, internal interference generated within the system plays a critical role in determining system capacity and voice quality. Two closely related techniques used in CDMA systems to reduce interference and thereby increase system capacity are power control and soft handoffs.

Power control is used on the forward link in CDMA systems to control the power of signals received at each mobile station. To maximize system capacity, the system allocates power to individual mobile stations according to the interference levels at each mobile station. The purpose of forward link power control is to ensure that each mobile station receives signals on the forward link at a desired minimum signal to interference ratio (SIR). The minimum SIR is chosen by the system operator to ensure a desired quality of service. Thus, the base stations transmit with highest power to those mobile stations with the highest interference levels, and with lesser power to mobile stations with lower levels of interference. In CDMA systems, the system capacity is maximized if the transmit power level of each base station is controlled so that its signals arrive at the mobile station receiver with the minimum required SIR.

As the mobile station moves around within the network, the channel conditions change continuously due to fast and slow fading, shadowing, number of users, external interference, and other factors. Power control algorithms dynamically control the transmitted power on the forward link to maintain the minimum SIR at the mobile station under all conditions. Two forward link power control mechanisms are employed in conventional CDMA systems: slow forward power control and fast forward power control.

In slow forward power control the mobile station keeps track of the number of error frames and if the number of error frames over the designated period exceeds a threshold, the mobile station sends a Power Measurement Report Message (PMRM) to the base station containing the total number of frames received in the period, the number of error frames, and the frame error rate (FER). On receiving the PMRM, the base station adjusts its transmit power based on the reported frame error rate.

Fading sources in mobile radio systems require much faster power control than is possible with slow forward power control. Therefore, it is common to also provide a mechanism for fast forward power control. In fast forward power control, the mobile station compares the SIR of the received signals to a reference SIR and signals the base station to either increase or decrease its transmit power. The power control commands typically comprise power control bits (PCBs), which are sent at a rate of 800 bps. A bit value of "1" signals the base station to decrease its transmit power. A bit value of "0" signals the base station to increase its transmit power. Upon receipt of a power control command from the mobile station, the base station steps its transmit power up or down by a fixed amount, referred to as the step size.

Another technique used in CDMA communication systems to reduce interference is known as a soft handoff. A handoff is the act of transferring support for a mobile station from one base station to another when the mobile station moves between cells. In a traditional "hard" handoff, the connection to the current base station is broken and a connection is made with the new base station to resume communication with the mobile station. This is known as a "break before make" handoff. Because all base stations in a CDMA system use the same frequency, it is possible with the connection to the new base station before terminating the connection with the current base station. This is known as a "make before break" or "soft" handoff. A soft handoff requires less power, which reduces interference and increases system capacity. The set of base stations serving a given mobile station during a soft handoff is referred to as the active set for that mobile station.

During a soft handoff, each base station in the active set for a mobile station transmits the same data to the mobile station. Ideally, each base station in the active set transmits signals to the mobile station at the same transmit power level. System interference is minimized when the transmit power level of all base stations in the active set for a mobile terminal is the same, i.e. balanced. The mobile station combines the received signals from all of the base stations in a diversity combiner. The mobile station determines the power control commands to send by comparing the SIR of the combined signals to the reference SIR. Since the power control commands are sent to all of the base stations in the active set, the balance of the transmit power is maintained between base stations in ideal conditions.

Unfortunately, ideal conditions are not the norm in wireless communication systems and the power control commands transmitted by the mobile stations are often subject to reception errors. When reception errors occur, the base stations may not control transmit power correctly, and the balance of transmit power may not be maintained between the base stations. Imbalance may occur, for example, if one of the base stations fails to correctly receive the power control command from the mobile station while the other base stations adjust their transmit power. This imbalance, if not cancelled by additional reception errors, increases interference and results in loss of traffic capacity in the downlink.

SUMMARY OF THE INVENTION

The present invention provides a method and apparatus to reduce forward link transmit power imbalance between a plurality of base stations supporting a mobile station in soft handoff. Periodic transmit power adjustments are made at each base station responsive to power control commands received from the mobile station to provide fast forward power control. The mobile station attempts to move the transmit power of the base stations towards a target power that results in a minimum SIR at the mobile station. The step size of transmit power adjustments at each base station according to the present invention varies dependent on a difference between the current transmit power of the base station and a common reference power. When a power control command from the mobile station moves the transmit power in a direction toward the common reference power (i.e., when the target power and the reference power lie in the same direction from the current transmit power of the base station), the step size is increased. Conversely, when the power control command from the mobile station moves the transmit power away from the common reference power (i.e., when the target power and the reference power lie in opposite directions from the current transmit power of the base station), the step size is decreased. Thus, movements toward the common reference power are amplified and movements away from it are attenuated, which effectively causes the transmit power of each base station to converge toward substantially the same value.

Because the mobile station uses its power control commands to move the base station transmit powers to a target power that results in a minimum SIR at the mobile station, the reference power may interfere with the power control when there is a substantial difference between the common reference level and the target power. The base station controller of the present invention avoids the problem by dynamically adjusting the common reference power to reduce the difference between it and the target power. Such adjustments to the common reference power may be done more slowly than the rate which the base stations update their respective transmit powers responsive to the power control commands from the mobile station. In one approach, the base station controller sets an initial common reference power for use by the base stations at the beginning of soft handoff. Then, during soft handoff, the base station controller periodically increments the common reference power up or down depending on an indication of reception errors at the mobile station. With this approach, the common reference power trends toward the target power.

By moving the common reference power toward the target power, which is not known a priori, the step size of the power adjustments may be large at the outset of soft handoff, but tends to decrease with repeated adjustments of the common reference power. Therefore, substantial transmit power imbalances between base stations are quickly reduced, while stability of power control by the mobile station at or near the target power is maintained. Because such transmit power imbalances increase interference within the wireless communication network, overall system capacity is reduced. Therefore, minimizing such imbalances tends to increase system capacity.

DETAILED DESCRIPTION OF THE INVENTION

Figure 1:
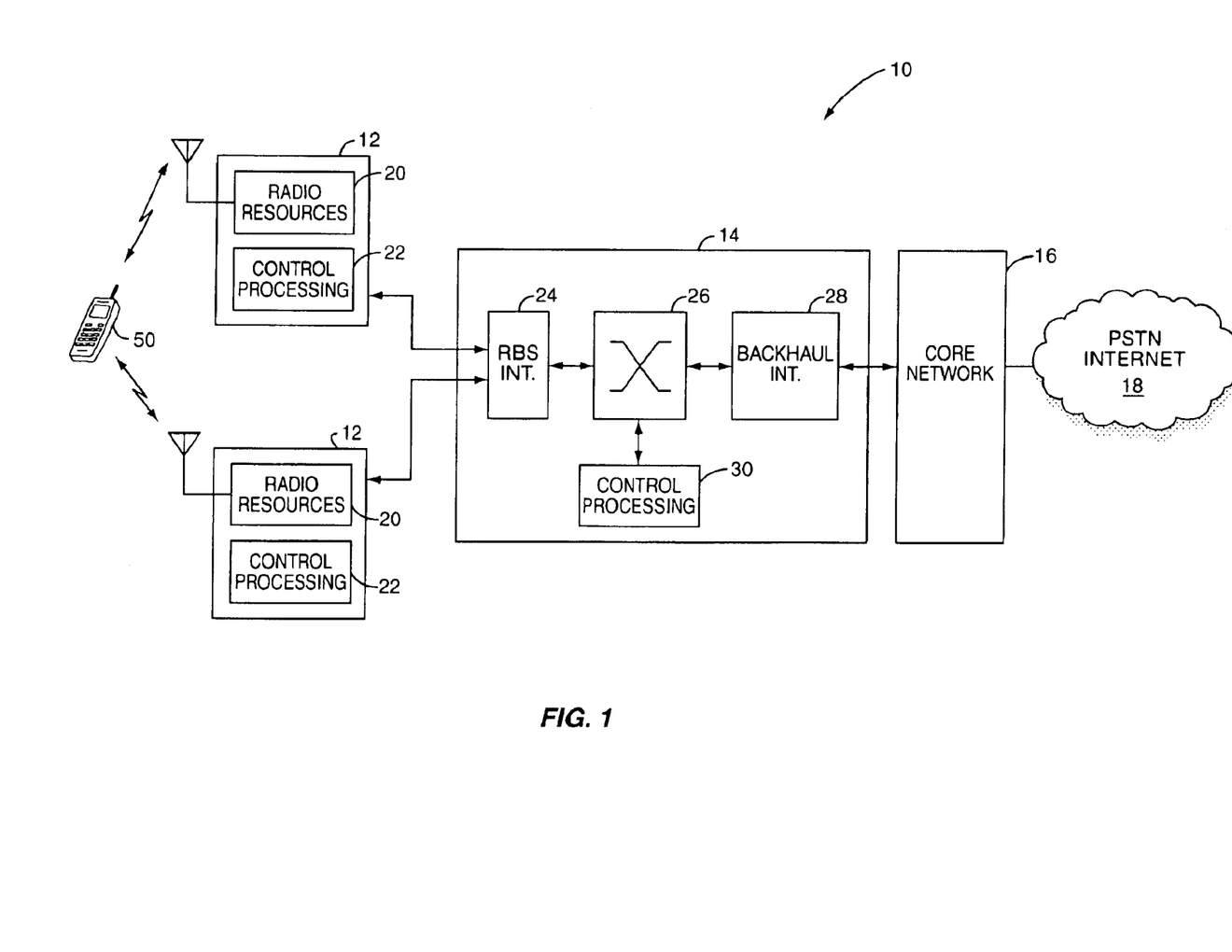
FIG. 1 is a diagram of an exemplary wireless communication network according to the present invention.

Referring now to the drawings, FIG. 1 shows a model of a wireless communication system 10 in which the present invention may be utilized. The wireless communication system 10 may, for example, comprise a Code Division Multiple Access (CDMA) communication system. The communication system 10 comprises a plurality of base stations 12 supporting over-the-air communications with mobile stations 50, and one or more base station controllers 14 for allocating communication channels and other resources used by the base stations 12. The base station controller 14 connects via a core network 16 to external networks such as the Public Switched Telephone Network (PSTN) and/or a Packet Data Network (PDN), e.g., the Internet. The core network 16 may comprise a mobile switching center (MSC) and/or packet data serving node (PDSN), which routes traffic to and from the external networks 18.

In an exemplary embodiment, each base station 12 comprises radio resources 20 (e.g., radio transceivers for transmitting and receiving multiple radio signals) and at least one processor 22, which may comprise multiple processors or processing systems, and generally includes memory and/or other form of storage for storing operating instructions and data. Operating under control of the BSC 14, processor 22 manages allocation/de-allocation of radio resources and forward link transmit power for supporting wireless communication with mobile stations 50.

In an exemplary embodiment, the BSC 14 comprises a base station interface 24 to communicate with base stations 12, traffic/signaling switching resources 26 to switch traffic and signaling, a backhaul interface 28 to communicate with the core network 16, and at least one processor 30, which may comprise multiple processors and/or processing systems, and generally includes memory and/or other forms of storage for operating instructions and data. As noted, the BSC 14 manages communication channel allocation by controlling the base stations 12, and routes traffic and signaling between the core network 16, and the appropriate ones of base stations 12. Further, the BSC 14 provides support for mobility management of mobile stations 50 as they are handed off between its associated base stations 12.

As shown in FIG. 1, mobile station 50 is engaged in a soft handoff. During a soft handoff, two or more base stations 12 serve the mobile station 50. The set of base stations 12 involved in the soft handoff is referred to as the active set for the mobile station 50. In some CDMA communication systems 100, such as IS-95 and cdma2000 systems, all of the base stations 12 in the active set for mobile station 50 transmit the same data on the forward link to the mobile station 50 and receive the same data from the mobile station 50 on the reverse link. Mobile station 50 combines the signals received from the base stations 12 in the active set using diversity combining techniques, which are well known to those skilled in the art. Since combining techniques are not material to the present invention, they are not discussed further herein.

While the mobile station 50 is in a soft handoff, forward link power control maintains the quality of forward link communications while minimizing interference with other mobile stations. The purpose of the forward link power control is to ensure that each mobile station 50 receives signals on the forward link at a desired minimum signal to interference ratio (SIR). In CDMA systems, system capacity is maximized if the transmit power level of each base station 12 is controlled so that its signals arrive at the mobile station 50 with the minimum required SIR.

The communication system 10 of the present invention uses a fast forward power control algorithm that minimizes power offsets between base stations 12 during soft handoff. The fast forward power control algorithm includes an inner power control loop executed by the base stations 12 and an outer control loop executed by the BSC 14. The inner power control loop adjusts transmit power of the base stations 12 responsive to power control commands from the mobile station 50. The inner power control loop varies the step size of transmit power adjustments based on a difference between a current transmit power of the base station and a common reference power $P_{REF}$ shared by the base stations 12 involved in the soft handoff. The inner power control loop adjusts transmit power once every PCG (1.25 msec) so that power adjustments are made at the rate of 800 Hz. As will be explained in more detail below, the inner loop power control loop adjusts step size as a function of a reference power $P_{REF}$, the current transmit power $P_T$ of the base station 12, and a convergence coefficient β to minimize power control drift between base stations 12 during a soft handoff.

The outer control loop adjusts the reference power $P_{REF}$ used by the inner power control loop. The outer control loop is equal to one frame or 16 PCGs so that the reference power $P_{REF}$ is updated at the rate of 50 Hz. The outer control loop function is performed by the BSC 14, which signals the reference power $P_{REF}$ and convergence coefficient β to the base stations 12.

The inner power control loop implemented by the base stations 12 relies on power control commands transmitted from the mobile station 50 to the base station 12. During a soft handoff, the mobile station 50 compares the SIR of the combined signals received from the base stations 12 to a reference SIR and signals the base stations 12 to either increase or decrease their transmit powers. If the measured SIR is less than the reference SIR, the mobile station 50 sends an "up" signal to the base stations 12. Conversely, if the measured SIR is greater than the reference SIR, the mobile station 50 sends a "down" signal to the base stations 12. Thus, the mobile station 50 attempts to move the transmit powers of the base stations 12 to a target power that meets the minimum required SIR. Power control commands are sent as power control bits (PCBs) as is well known in the art. A bit value of "1" signals the base stations 12 to decrease their forward link transmit power. A bit value of "0" signals the base stations 12 to increase their forward link transmit power.

Upon receipt of a power control command from the mobile station 50, the base stations 12 step their transmit power up or down accordingly. In conventional CDMA communication systems, the base stations 12 step their transmit power up or down in fixed increments. In contrast, the inner power control loop of the present invention has the effect of varying the step size of the power adjustments as a function of the reference power $P_{REF}$, the current transmit power $P_T$, and the convergence coefficient β. The step size of the power adjustments at each base station 12 is dependent on a difference between the transmit power $P_T$ of the base station 12 and the reference power $P_{REF}$. Thus, if the transmit powers of the base stations 12 are not in balance, the base stations 12 will adjust their respective transmit powers by different amounts. This variable power adjustment mechanism tends to reduce the transmit power imbalance between base stations 12.

The inner loop power control mechanism is described by Equation 1 below:

$$P_T(k+1)=\min\{\max\{\beta \times P_T(k)+(1-\beta)P_{REF}(k)+\Delta_f(k+1),\text{MinPower}\},\text{MaxPower}\} \quad \text{Eq. (1)}$$

The variables used in Eq. 1 are defined as follows:

$P_T(k+1)$ is the new transmit power level in dBp (dB with respect to pilot power) for the base station at time k+1, $P_T(k)$ is the transmit power in dBp for the base station at time k, $P_{REF}(k)$ is the reference power in dBp at time k, $\Delta_f(k+1)$ is the fixed power adjustment in dB called for by the mobile station applied at time k+1, β is the convergence coefficient, k is the current time in units of 1.25 msec PCGs, MinPower is the minimum transmit power in dB allowed, and MaxPower is the maximum transmit power in dB allowed.

As shown in Eq. 1, each base station 12 computes a provisional transmit power defined by the term $\beta \times P_T(k)+(1-\beta)P_{REF}(k)+\Delta_f(k+1)$, denoted herein as $P_{PROV}$, and compares it to MinPower and MaxPower. If the limits MinPower or MaxPower are not exceeded, the base station 12 sets the new transmit power $P_T(k+1)$ equal to $P_{PROV}$. Otherwise, it sets the new transmit power to MinPower (if the lower limit is exceeded) or to MaxPower if the upper limit is exceeded.

Figure 2:
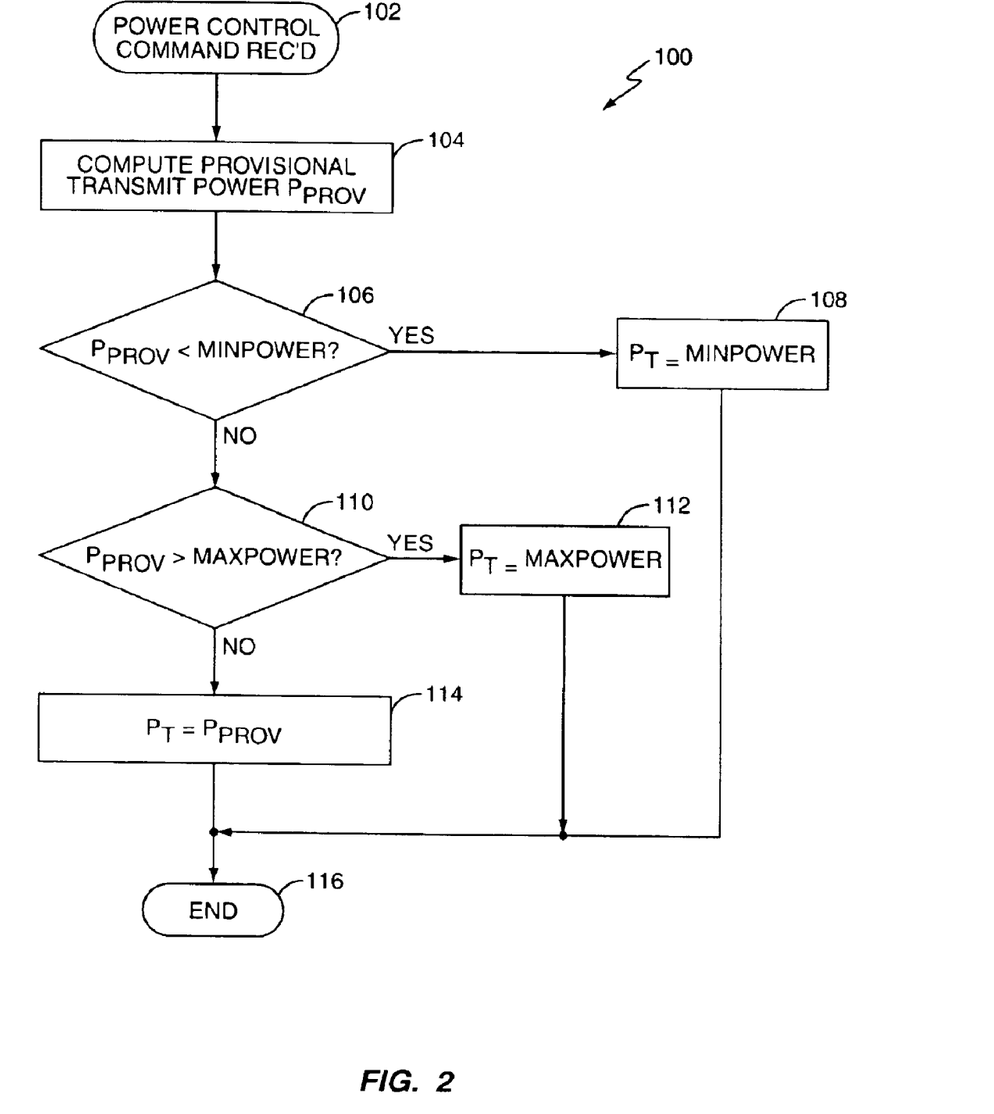
FIG. 2 is a flow diagram illustrating exemplary logic for computing a transmit power level at the base stations in the network of FIG. 1.

FIG. 2 is a flow diagram illustrating a power control procedure 100 according to the present invention implemented at each base station 12. The flow diagram shown in FIG. 2 corresponds to the inner power control loop performed by the base stations 12. The power control procedure 100 is triggered when a power control command is received at the base station 12 (block 102). It should be noted that there is a time delay τ between the transmission of a power control command and the time that the power control command is decoded. Therefore, the base station 12 computes its transmit power at time k+1 based on the power control bit sent by the mobile station 50 at time k+1−τ. That is, the value of $\Delta_f(k+1)$ depends on the power control bits sent at time k+1−τ. If no power control command is received, for example, because the receiver is out of lock, $\Delta_f(k+1)$ is assumed to be 0. The computation of $\Delta_f(k+1)$ is shown in Equation 2 below:

$$\Delta_f(k+1) = \begin{cases} \Delta^{up} & \text{if } PCB(k+1-\tau) = Up \\ 0 & \text{if } OutofLock \\ -\Delta^{down} & \text{if } PCB(k+1-\tau) = Up, \end{cases} \quad \text{Eq. (2)}$$

where $\Delta^{up}$ and $\Delta^{down}$ are positive numbers in dB.

Upon receipt of the power control command from the mobile station 50, the base station 12 computes a provisional transmit power $P_{PROV}$ (block 104). The base station 12 compares the provisional transmit power $P_{PROV}$ to Min-Power at block 106 and to MaxPower at block 110. If the provisional transmit power $P_{PROV}$ is less than MinPower, the new transmit power $P_T(k+1)$ is set equal to MinPower (block 108). If the provisional transmit power $P_{PROV}$ is greater than MaxPower, the base station 12 sets the new transmit power $P_T(k+1)$ equal to MaxPower (block 112). If the provisional transmit power $P_{PROV}$ is greater than MinPower and less than MaxPower, the base station 12 sets the new transmit power $P_T(k+1)$ equal to the provisional transmit power $P_{PROV}$.

The computation of the provisional transmit power $P_{PROV}$ in step 104 is worthy of some explanation. The term $\beta \times P_T(k)+(1-\beta)P_{REF}(k)$ in Eq. (1) is a weighted sum of the current transmit power level $P_T(k)$ and the current reference power $P_{REF}(k)$ before the power adjustment. The base station 12 computes this weighted sum and adds it to a fixed power adjustment term $\Delta_f(k+1)$ to obtain the provisional transmit power $P_{PROV}$. The term $\beta \times P_T(k)+(1-\beta)P_{REF}(k)+\Delta_f(k+1)$ in Eq. (1) is mathematically equivalent to Eq. 3 below:

$$P_T(k)+(1-\beta)(P_{REF}(k)-P_T)+\Delta_f(k+1) \quad \text{Eq. (3)}$$

The term $(1-\beta)(P_{REF}(k)-P_T)$ in Eq. 3 may be considered a variable power adjustment term applied at time k+1, which is denoted herein as $\Delta_v(k+1)$. Therefore Eq. 3 may be rewritten as:

$$P_T(k)+\Delta_v(k+1)+\Delta_f(k+1) \quad \text{Eq. (4)}$$

In Eq. (4) the sum $\Delta_v(k+1)+\Delta_f(k+1)$ represents the amount of the total power adjustment, which comprises a fixed component $\Delta_f(k+1)$ and a variable component $\Delta_v(k+1)$. The variable component $\Delta_v(k+1)$ is dependent on the difference between the current reference power $P_{REF}(k)$ and the current transmit power $P_T(k)$ of the base station 12 before the power adjustment. The fixed component $\Delta_f(k+1)$ represents either a positive step $\Delta^{up}$ or negative step $-\Delta^{down}$ of a fixed magnitude that depends on the power control command from the mobile station 50. If the mobile station 50 signals the base station 12 to increase power, $\Delta_f(k+1)$ is a fixed upward adjustment value $\Delta^{up}$. If the mobile station 50 signals the base station 12 to reduce power, $\Delta_f(k+1)$ is a fixed downward adjustment value $-\Delta^{down}$. The magnitude of the fixed upward adjustment value $\Delta^{up}$ and the fixed downward adjustment value $-\Delta^{down}$ may be the same or may be different.

The net effect of the power adjustment calculation in step 104 is to vary the step size of the power adjustment made by the base station 12 dependent on the difference between the current transmit power level $P_T(k)$ at the base station 12 and the current reference power $P_{REF}(k)$. When the current transmit power level $P_T(k)$ and the current reference power $P_{REF}(k)$ are equal, the amount of the power adjustment is equal to the fixed component $\Delta_f(k+1)$. When the transmit power $P_T(k)$ of a base station 12 drifts away from the reference power $P_{REF}(k)$, the inner power control loop tends to resist further movement away from the reference power $P_{REF}(k)$ by reducing the step size of the power adjustment and to accelerate movement towards the reference power $P_{REF}(k)$ by increasing step size of the power algorithm. This behavior of the inner loop power control loop is illustrated in FIGS. 4 and 5.

Figure 4:
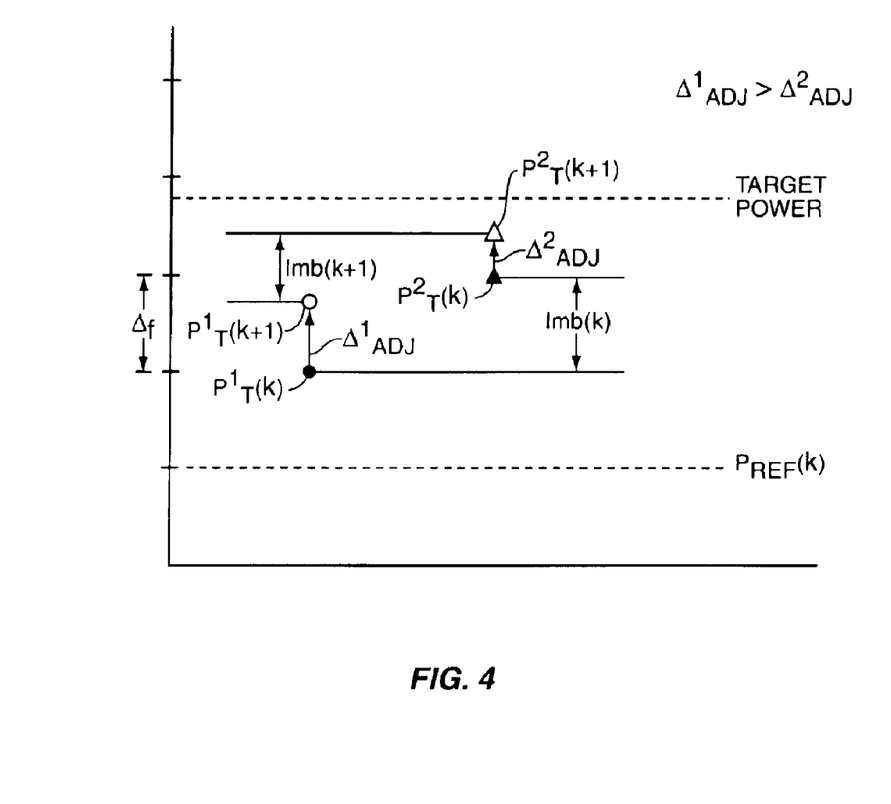
FIGS. 4 and 5 illustrate the variability of transmit power adjustment step size under different transmit power conditions.

FIG. 4 shows the transmit power level of two base stations 12, referred to in this example as BS1 and BS2, before and after a power adjustment. BS1 is represented by circles in FIG. 4, and BS2 is represented by triangles. The current transmit powers of the respective base stations 12 are denominated by the notation $P_T^i(k)$, where i is an index denoting the number of the base station 12. As shown in FIG. 4, the current transmit power for both base stations 12 is greater than $P_{REF}(k)$. In this example, the mobile station 50 signals the base stations 12 to increase their respective transmit powers. In conventional CDMA communication systems, power adjustments are made in fixed step sizes. However, the implicit variable power adjustment term $\Delta_v(k+1)$ in the inner power control loop of the present invention causes the step sizes to vary. In the example of FIG. 4, the target power sought by the mobile station 50 and the reference power $P_{REF}(k)$ lie in opposite directions from the current transmit powers of the base stations 12. In this case, the base stations 12 are adjusting their respective transmit powers so as to move away from $P_{REF}(k)$. When the power adjustment is in a direction away from $P_{REF}(k)$, the variable power adjustment term $\Delta_v(k+1)$ causes the step size to be reduced by an amount proportional to the difference between the current reference power $P_{REF}(k)$ and the current transmit power $P_T(k)$ of the base station 12. Thus, while both base stations 12 will increase the transmit power on the traffic channel, BS2 will increase its transmit power by a lesser amount than BS1. In the example shown in FIG. 2, BS1 increases its transmit power by an amount equal to $\Delta^1_{ADJ}$, while BS2 increases its transmit power by an amount equal to $\Delta^2_{ADJ}$, where $\Delta_{ADJ}^2$ is less than $\Delta^1_{ADJ}$. In both cases, the magnitude of the power adjustment $\Delta^i_{ADJ}$ is less than the fixed power adjustment term $\Delta_f(k+1)$. Thus, the variable power adjustment term $\Delta^i_v(k+1)$ reduces the step size of the total power adjustment.

Figure 5:
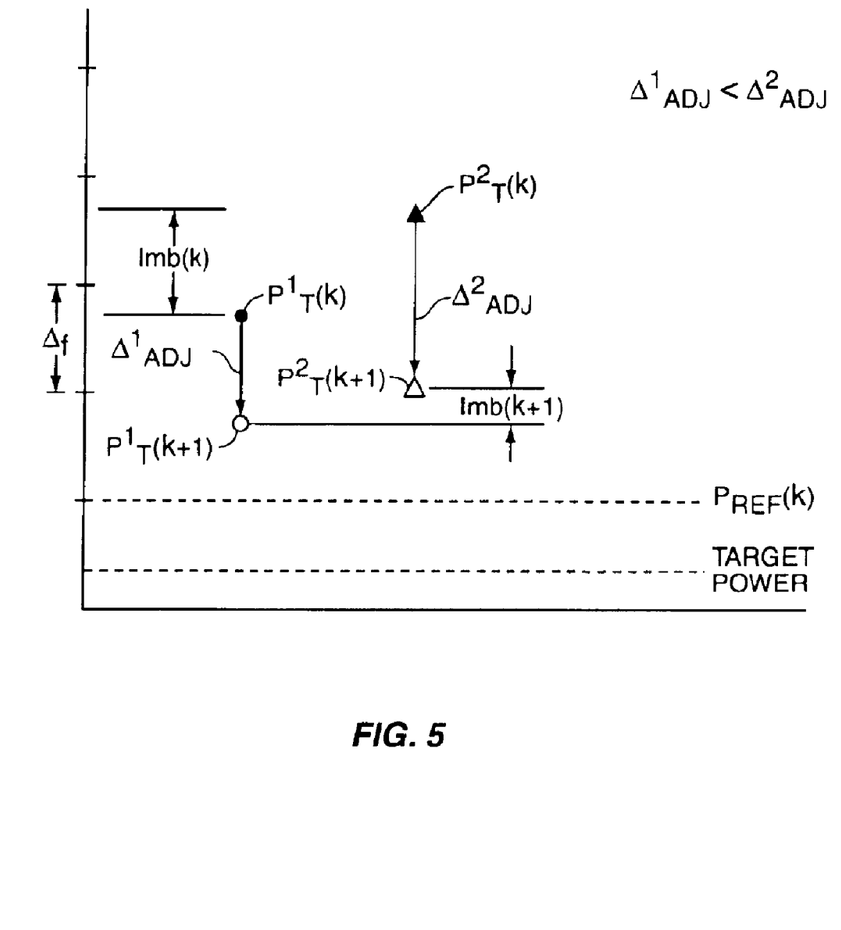

FIG. 5 illustrates the effect of the variable power adjustment term $\Delta_v(k+1)$ when the power adjustment is in the direction of $P_{REF}(k)$. As shown in FIG. 5, the current transmit power $P_T(k)$ of the base stations 12 before the power adjustment is greater than $P_{REF}(k)$. The target power sought by the mobile station 50 is less than the reference power $P_{REF}(k)$ so the mobile station 50 signals the base stations 12 to reduce their transmit powers. In this case, both base stations 12 adjust their respective transmit powers so as to move towards the reference power $P_{REF}(k)$. The variable power adjustment term $\Delta_v(k+1)$ amplifies the downward adjustment by an additional amount proportional to the difference between the current transmit powers $P^i_T(k)$ of the respective base stations 12 and the reference power $P_{REF}(k)$. In the example shown in FIG. 5, BS1 decreases its transmit power by an amount equal to $\Delta^1_{ADJ}$, while BS2 increases its transmit power by an amount equal to $\Delta^2_{ADJ}$, where $\Delta^2_{ADJ}$ is greater than $\Delta^1_{ADJ}$. Since the transmit power $P^2_T(k)$ for BS2 is greater than the transmit power $P^1_T(k)$ for BS1, BS2 will make a larger power adjustment than will BS1. In both cases, the magnitude of the power adjustment $\Delta^i_{ADJ}$ is greater than the magnitude of the fixed power adjustment term $\Delta_f(k+1)$. Thus, the variable power adjustment term $\Delta^i_v(k+1)$ amplifies the step size of the total power adjustment when moving in the direction of $P_{REF}(k)$.

As shown in FIGS. 4 and 5, the effect of the variable power adjustment term $\Delta_v(k+1)$ is to vary the step size of power adjustments dependent on a difference between the reference power $P_{REF}(k)$ and the current transmit power $P_T(k)$ of the base station 12. When the transmit power $P_T(k)$ of all base stations 12 in soft handoff is balanced, the amount of the power adjustments will be the same for all base stations 12. However, when the transmit power levels are imbalanced, as shown in FIGS. 4 and 5, the variable power adjustment term $\Delta_x(k+1)$ applied independently at each base station 12 reduces the amount of the imbalance by varying the step sizes of the power adjustments for the base stations 12 by different amounts. The net effect of the power adjustments is to reduce the transmit power imbalance between base stations 12 from Im b(k) to Im b(k+1). The sensitivity of the power adjustments to differences between reference power $P_{REF}$ and transmit power $P_T$ is determined by the convergence coefficient β, which is always a value between 0 and 1. When β is small, the transmit powers $P_T$ of the base stations 12 will converge more rapidly towards the reference power $P_{REF}$ than when β is large.

If the reference power $P_{REF}$ is arbitrarily chosen, the reference power $P_{REF}$ may differ substantially from the target power sought by the mobile station 50 that is needed to maintain the desired SIR. In this case, the inner power control loop becomes less responsive to power control commands from the mobile station 50 since it has to compensate for differences between the current transmit power $P_T(k)$ and the reference power $P_{REF}(k)$. This difference can have a negative impact on performance of the inner power control loop. This negative impact is illustrated in FIG. 4 where the reference power $P_{REF}(k)$ impedes adjustment towards the desired target power. To avoid the negative impact, a large value may be chosen for the convergence coefficient β, but this reduces the rate of convergence between the two base stations 12 resulting in a reduction of system capacity. Therefore, it is desirable to that the reference power $P_{REF}(k)$ be as close as possible to the target power. This problem is addressed in the present invention by the outer control loop.

The outer control loop according to the present invention periodically adjusts the reference power $P_{REF}$ used by the inner power control loop to urge it closer to the target power sought by the mobile station 50 that results in the minimum SIR. The outer control loop is based on an error report message received form the mobile station 50. The power measurement report message (PMRM) incorporated in the IS-95 and IS-2000 standards published by the Telecommunications Industry Association (TIA) and Electronics Industry Association (EIA) may be used in the present invention to provide the error reports. In one embodiment of the invention, the mobile station 50 in a soft handoff keeps a count of the number of frame erasures or error frames. When the count of the frame erasures reaches a predetermined threshold, e.g., a count of two, the mobile station 50 sends a PMRM to the base stations 12 and resets its counter. The PMRM may contain the number of frames received since the last PMRM and the number of frame erasures, as well as other information.

Those skilled in the art will appreciate that other criteria may be used to trigger a PMRM from the mobile station 50. For example, the mobile station 50 could be programmed to report the FER at predetermined intervals, or when the FER reaches a predetermined threshold. These and other equivalent variations of the PMRM are within the scope of the present invention.

The BSC 14 adjusts the reference power $P_{REF}$ based on the PMRMs from the mobile station 50, once every 20 msec frame. As described in more detail below, adjustment of the reference power based on the PMRM includes adjustment when no PMRM is received in a designated time period. The outer control loop is described by Equation 5 below:

$$P_{REF}(n+1)=\min\{\max\{P_{REF}(n)+\delta(n+1),\text{MinRefPower}\},\text{MaxRefPower}\} \quad \text{Eq. (5)}$$

The variables in Eq. (5) are defined as follows:
$P_{REF}(n+1)$ is new reference power in dBp,
MinRefPower is the minimum reference power in dBp,
MaxRefPower is the maximum reference power in dBp,
$\delta(n+1)$ is the adjustment term in dB applied at time n+1, and
n is the current time in frames.

As shown in Eq. (5), BSC 14 computes the new reference power $P_{REF}(n+1)$ each frame by increasing or decreasing the current reference power $P_{REF}(n)$ and comparing the result to MinRefPower and MaxRefPower. If the limits MinRefPower and MaxRefPower are not exceeded, the BSC 14 sets the new reference power $P_{REF}(n+1)$ equal to $P_{REF}(n)+\delta(n+1)$. Otherwise, it sets the new reference power $P_{REF}(n+1)$ to MinRefpower (if the lower limit is exceeded) or to MaxRefPower (if the upper limit is exceeded).

Figure 3:
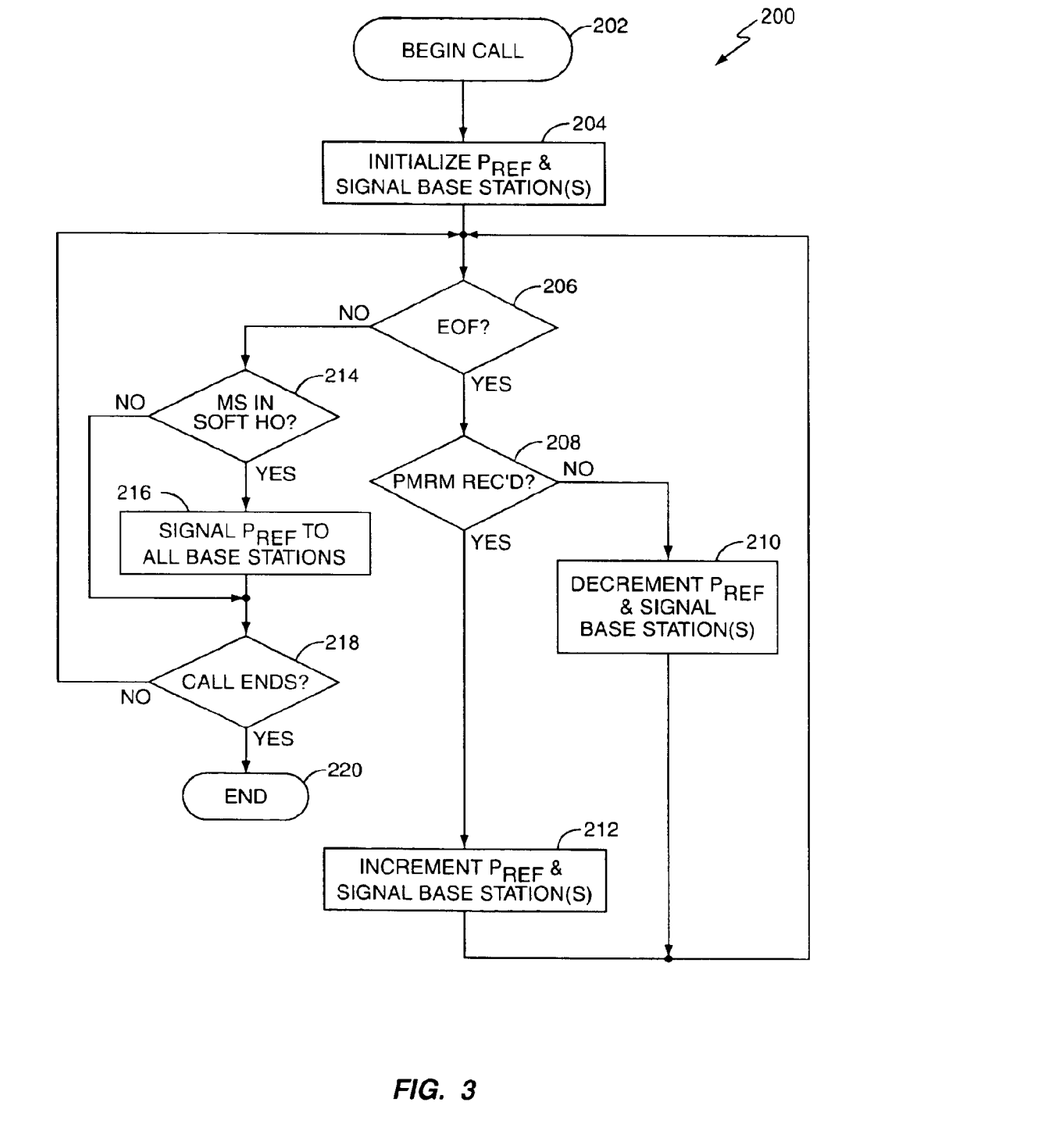
FIG. 3 is a flow diagram illustrating exemplary logic for dynamically adjusting a common reference power at the base station controller of FIG. 1.

FIG. 3 is a flow diagram illustrating the control procedure 200 implemented in the BSC 14. The procedure begins when the mobile station 50 establishes a call (block 202). Alternatively, the procedure 200 could be started when the mobile station 50 begins a soft handoff. When the call begins, the BSC 14 initializes the reference power $P_{REF}$ to a default value and signals the reference power $P_{REF}$ to all base stations 12 communicating with the mobile station 50. After the reference power $P_{REF}$ is initialized, the BSC 14 updates the reference power $P_{REF}$ once every frame. At block 206, the BSC 14 waits until the end of frame (EOF) is reached. At the end of each frame, the BSC 14 determines whether a power measurement report message (PMRM) was received from the mobile station 50 during the preceding frame (block 208). If the BSC 14 did not receive a PMRM from the mobile station 50, the BSC 14 decreases the current reference power $P_{REF}(n)$ (block 210). On the other hand, if the BSC 14 receives a PMRM (block 208), the BSC 14 increases the reference power $P_{REF}(n)$ and signals the updated reference power $P_{REF}(n+1)$ to the base stations 12 (block 212). When the BSC 14 detects that the mobile station 50 is in a soft handoff (block 214), the BSC 14 signals the current reference power $P_{REF}(n)$ to the base stations 12 involved in the soft handoff (block 216). When the BSC 14 detects that the call has ended (block 218), the procedure terminates (block (220). As long as the procedure 200 is running, the reference power is updated once every 20 msec frame.

The computation of the updated reference power in blocks 210 and 212 is shown in Eq. 5. As shown in Eq. 5, the updated reference power $P_{REF}(n+1)$ is equal to the old reference power $P_{REF}(n)$ plus a fixed increment $\delta(n)$. The fixed increment $\delta(n)$ is a fixed positive adjustment $\delta^{up}$ when a PMRM is received, and a fixed negative adjustment $-\delta^{down}$ when no PMRM is received. This calculation is shown in Eq. (6) below:

$$\delta(n) = \begin{cases} \delta^{up} & \text{if } PMRM = TRUE \\ -\delta^{down} & \text{if } PMRM = FALSE \end{cases} \quad \text{Eq. (6)}$$

where $\delta^{up}$ and $\delta^{down}$ are fixed positive values.

In a preferred embodiment of the invention, the downward step size $\delta^{down}$ for a negative adjustment of the reference power $P_{REF}$ is smaller than the upward step size $\delta^{up}$ for positive adjustments of the reference power $P_{REF}$. The downward step size $\delta^{down}$ may be a small fraction of the upward step size $\delta^{up}$. Thus, when a PMRM is received, the base station 12 makes a relatively large upward adjustment in the reference power $P_{REF}$ and makes smaller downward adjustments in frames when no PMRMs are received.

Those skilled in the art will appreciate that additional methods of computing the adjustments to the reference power could be utilized. For example, the BSC 14 could, in some embodiments, extract a FER from PMRMs sent once every frame (or some other designated period) and adjust the reference power based on the reported FER. This approach would, however, increase the signaling required compared to procedure shown in Eq. (6).

The outer control loop, in effect, predicts a reference power $P_{REF}$ that is close to the target power that results in the minimum SIR. As a result, the present invention may use a more aggressive (lower) convergence coefficient β which makes the inner power control loop more sensitive to differences between the current transmit power $P_T(k)$ and the reference power $P_{REF}(k)$. Consequently, the present invention will more quickly restore transmit power balance between base stations 12 in a soft handoff when an imbalance occurs. Another benefit of the present invention is that the dynamic reference power $P_{REF}$ can be used to control the base station transmit power when the base station 12 does not receive the power control commands from the mobile station 50. The dynamic reference power may also be used to initialize forward transmit power for base stations 12 at the start of the soft handoff.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of controlling transmit powers at a plurality of base stations during a soft handoff to reduce power imbalance between base stations, the method comprising:
   determining a common reference power for a plurality of base stations for a power control interval based on power measurement reports from one or more mobile stations, said power control interval comprising a plurality of power adjustment intervals;
   receiving power control commands at the base stations from a mobile station in soft handoff during a plurality of power adjustment intervals in said power control interval;
   adjusting the transmit powers at the respective base stations during each of said plurality of power adjustment intervals responsive to the power control commands from the mobile station by applying power adjustments to current transmit powers of the base stations; and
   varying a step size of the power adjustments during each of said plurality of power adjustment intervals as a function of the current transmit powers and the common reference power.

2. The method of claim 1, wherein varying a step size of the power adjustments as a function of the current transmit powers and a common reference power comprises varying the step size of the power adjustment at each base station based on a difference between the current transmit power of the base station and the common reference power.

3. The method of claim 2, wherein varying the step size of the power adjustment at each base station based on a difference between the current transmit power of the base station and the common reference power comprises:
   increasing the step size if the power control commands from the mobile station move the transmit power of the base station toward the common reference power; and
   decreasing the step size if the power control commands from the mobile station move the transmit power of the base station away from the common reference power.

4. The method of claim 3, wherein increasing the step size comprises changing the transmit power by an adjustment term formed as a sum of a fixed adjustment term and a variable adjustment term.

5. The method of claim 3, wherein decreasing the step size comprises changing the transmit power by an adjustment term formed as a difference of a fixed adjustment term and a variable adjustment term.

6. The method of claim 2, wherein varying the step size of the power adjustment at each base station based on a difference between the current transmit power of the base station and the common reference power comprises calculating the step size based on a fixed adjustment term dependent on the power control commands from the mobile station and a variable adjustment term proportional to the difference between the current transmit power of the base station and the common reference power.

7. The method of claim 6, wherein calculating the step size comprises:
   selecting one of a fixed upward adjustment value and a fixed downward adjustment value as the fixed adjustment term based on the power control commands from the mobile station; and
   calculating the variable adjustment term by subtracting the common reference power from the current transmit power of the base station.

8. The method of claim 7, wherein calculating the step size further comprises combining the fixed adjustment term with the variable adjustment term.

9. The method of claim 7, wherein calculating the variable adjustment term by subtracting the common reference power from the current transmit power of the base station further comprises multiplying the variable adjustment term by a convergence coefficient.

10. The method of claim 9, further comprising selling a magnitude of the convergence coefficient to set a sensitivity of the power adjustment to the difference between the current transmit power of the base station and the common reference power.

11. The method of claim 1, wherein adjusting the common reference power based on reported frame errors at the mobile station comprises adjusting the common reference power upward if the mobile station sends a frame error report.

12. The method of claim 11, wherein adjusting the common reference power based on reported frame errors at the mobile station further comprises:
   receiving an error report from the mobile station at a base station controller communicatively couple to the base stations; and
   signaling the base stations such that the common reference power is adjusted upward by a predetermined increment value.

13. The method of claim 12, wherein adjusting the common reference power based on reported frame errors at the mobile station further comprises signaling the base stations such that the common reference power is adjusted downward by a predetermined decrement value if no error report is received from the mobile station within a defined period.

14. The method of claim 13, wherein the predetermined decrement value is smaller than the predetermined increment value.

15. The method of claim 13, wherein the defined period defines an adjustment rate for the common reference power that is slower than a rate at which the power control commands are received from the mobile station at the base stations.

16. The method of claim 13, wherein the adjustment rate is a frame rate of forward link data frames defined for forward link signaling between the base stations and the mobile station.

17. The method of claim 16, wherein the power control commands from the mobile station are received at the base stations at sixteen times the frame rate.

18. The method of claim 1 wherein the power measurement report from the mobile station includes the number of error frames since the last power measurement report.

19. A wireless communication network comprising:
a base station controller including at least one processor programmed to determine a common reference power for a plurality of base stations for a power control interval based on power measurement reports from one or more mobile stations, said power control interval comprising a plurality of power adjustment intervals;
a plurality of base stations under the control of the base station controller for communicating with a mobile station during soft handoff, wherein said base stations receive power control commands from said mobile station during a plurality of power adjustment intervals in said power control interval and include at least one processor programmed to:
adjust a transmit power of the base station during each of said plurality of power adjustment intervals responsive to a power control command from the mobile station by applying a power adjustment to a current transmit power of the base station; and
vary a step size of the power adjustment during each of said plurality of power adjustment intervals as a function of the current transmit power and the common reference power.

20. The wireless communication network of claim 19, wherein the at least one processor in each base station varies the step size of the power adjustment in proportion to a difference between the current transmit power of the base station and the common reference power.

21. The wireless communication network of claim 20, wherein the at least one processor in each base station increases the step size of the power adjustment if the power control command from the mobile station would move the transmit power toward the common reference power.

22. The wireless communication network of claim 21, wherein the at least one processor in each base station decreases the step size if the power control command from the mobile station would move the transmit power away from the common reference power.

23. The wireless communication network of claim 22, wherein the at least one processor in each base station decreases the step size by computing the step size as a difference between a fixed adjustment term and a variable adjustment term.

24. The wireless communication network of claim 23, wherein the at least one processor in each base station increases the step size of the power adjustment by computing the step size as a sum of the fixed adjustment term and the variable adjustment term.

25. The wireless communication network of claim 24, wherein the at least one processor in each base station selects one of a fixed upward adjustment value and a fixed downward adjustment value as the fixed adjustment term based on the power control command from the mobile station.

26. The wireless communication network of claim 24, wherein the at least one processor in each base station calculates the variable adjustment term as the difference between the common reference power and the current transmit power.

27. The wireless communication network of claim 26, wherein the at least one processor in each base station calculates the difference between the common reference power and the current transmit power by subtracting the common reference power from the current transmit power.

28. The wireless communication network of claim 27, wherein the at least one processor in each base station further calculates the variable adjustment term based on scaling the variable adjustment term by a convergence coefficient to set a sensitivity of step size adjustment to the difference between the common reference power and the current transmit power.

29. The wireless communication network of claim 19, wherein the at least one processor in the base station controller adjusts the common reference power based on reported errors at the mobile station by:
receiving an error report from the mobile station; and
signaling the base stations such that the common reference power is adjusted upward by a predetermined increment value.

30. The wireless communication network of claim 29, wherein the at least one processor in the base station controller further adjusts the common reference power by signaling the base stations such that the common reference power is adjusted downward by a predetermined decrement value if no error report is received from the mobile station within a defined reporting period.

31. The wireless communication network of claim 30, wherein the defined reporting period defines an adjustment rate that is slower than a rate at which the power control commands are received from the mobile station at the base stations.

32. The wireless communication network of claim 31, wherein the adjustment rate is a frame rate of forward link data frames defined for forward link signaling between the base stations and the mobile station.

33. The wireless communication network of claim 32, wherein the power control commands from the mobile station are received at the base stations at sixteen times the frame rate.

34. The wireless communication network of claim 32, wherein the at least one processor in the base station controller maintains an frame timer for timing adjustments to the common reference power.

35. The wireless communication system of claim 19 wherein the power measurement report from the mobile station includes the number of error frames since the last power measurement report.

36. A method for controlling a common reference power used by a plurality of base stations during a soft handoff to vary step sizes of forward link transmit power adjustments, said method comprising:
receiving power measurement reports from a mobile station in soft handoff; and
adjusting the common reference power responsive to the power measurement reports from the mobile station; and wherein, during each of a plurality of power adjustment intervals, each base station in said plurality of base stations makes power adjustments to a current transmit power being used for the mobile station responsive to power control commands received from the mobile station, and varies the step sizes used for individual ones of said power adjustments made within each cower adjustment interval, as a function of the current transmit power and the common reference power.

37. The method of claim 36 wherein adjusting the common reference power comprises increasing the common reference power responsive to the receipt of a power measurement report from the mobile station.

38. The method of claim 37 further comprising decreasing the common reference power if no power measurement report is received within a predetermined time period.

39. The method of claim 38 wherein decreasing the common reference power comprises decrementing the common reference power by a defined downward amount.

40. The method of claim 39, wherein increasing the common reference power comprises incrementing the common reference power by a defined upward amount, and wherein the defined downward amount is a fraction of the defined upward amount.

41. The method of claim 36, wherein adjusting the common reference power comprises:

maintaining an interval timer for timing an update interval;

determining whether a power measurement report is received within the update interval; and incrementing the common reference power if a power measurement report was received during the interval, and decrementing the common reference power if a power measurement report was not received during the interval.

42. The method of claim 41, wherein maintaining an interval timer comprises maintaining a communication frame timer at a base station controller controlling adjustments of the common reference power.

43. The method of claim 36 wherein the power measurement report from the mobile station includes the number of error frames since the last power measurement report.

44. A method of controlling transmit powers at a plurality of base stations during a soft handoff to reduce power imbalance between base stations, the method comprising:

determining a common reference power for a plurality of base stations for a power control interval based on power measurement reports from one or more mobile stations, said power control interval comprising a plurality of power adjustment intervals;

receiving power control commands from a mobile station in soft handoff during a plurality of power adjustment intervals in said power control interval;

computing a variable adjustment factor for the base stations during each of said plurality of power adjustment intervals as a function of the current transmit powers of the base stations and the common reference power;

adjusting the transmit powers at the respective base stations during each of said plurality of power adjustment intervals responsive to the power control commands from the mobile station based on said variable adjustment factor and a fixed adjustment factor.

45. A wireless communication network comprising:

a base station controller including at least one processor programmed to determine a common reference power for a plurality of base stations for a power control interval, said power control interval comprising a plurality of power adjustment intervals based on power measurement reports from one or more mobile stations;

a plurality of base stations under the control of the base station controller for communicating with a mobile station during soft handoff, wherein said base stations receive power control commands from said mobile station during a plurality of power adjustment intervals in said power control interval and include at least one processor programmed to:

compute a variable adjustment factor for the base stations during each of said plurality of power adjustment intervals as a function of the current transmit powers of the base stations and the common reference power;

adjust the transmit powers at the respective base stations during each of said plurality of power adjustment intervals responsive to the power control commands from the mobile station based on said variable adjustment factor and a fixed adjustment factor.

* * * * *

UNITED STATES PATENT AND TRADEMARK OFFICE
CERTIFICATE OF CORRECTION

PATENT NO. : 6,931,257 B2  Page 1 of 1
APPLICATION NO. : 10/087368
DATED : August 16, 2005
INVENTOR(S) : Shahidi et al.

It is certified that error appears in the above-identified patent and that said Letters Patent is hereby corrected as shown below:

In Column 8, Line 36, delete "$\Delta_{ADJ}{}^2$" and insert -- $\Delta^2{}_{ADJ}$ --, therefor.

In Column 12, Line 46, in Claim 10, delete "selling" and insert -- setting --, therefor.

In Column 15, Line 8, in Claim 36, delete "cower" and insert -- power --, therefor.

Signed and Sealed this

First Day of April, 2008

JON W. DUDAS
*Director of the United States Patent and Trademark Office*